United States Patent

[11] 3,601,808

[72] Inventor David Vlack
Aurora, Ill.
[21] Appl. No. 745,738
[22] Filed July 18, 1968
[45] Patented Aug. 24, 1971
[73] Assignee Bell Telephone Laboratories, Incorpoarated
Berkeley Heights, N.J.

[54] ADVANCED KEYWORD ASSOCIATIVE ACCESS MEMORY SYSTEM
9 Claims, 6 Drawing Figs.

[52] U.S. Cl. .......... 340/172.5, 340/174.1 H
[51] Int. Cl. .......... G06f 7/22
[50] Field of Search .......... 235/157; 340/172.5, 174.1

[56] References Cited
UNITED STATES PATENTS

| | | | |
|---|---|---|---|
| 3,030,609 | 4/1962 | Albrecht | 340/172.5 |
| 3,337,852 | 8/1967 | Lee et al. | 340/172.5 |
| 3,375,507 | 3/1968 | Gleim et al. | 340/174.1 |
| 2,969,525 | 1/1961 | Hill | 340/174.1 |
| 3,149,309 | 9/1964 | Schmidt | 340/172.5 |
| 3,231,869 | 1/1966 | Hill et al. | 340/172.5 |
| 3,327,294 | 6/1967 | Furman et al. | 340/172.5 |
| 3,348,213 | 10/1967 | Evans | 340/172.5 |
| 3,350,694 | 10/1967 | Kusnick et al. | 340/172.5 |
| 3,437,998 | 4/1969 | Bennett et al. | 340/172.5 |
| 3,493,935 | 2/1970 | Questa | 340/172.5 |

*Primary Examiner*—Paul J. Henon
*Assistant Examiner*—Melvin B. Chapnick
*Attorneys*—R. J. Guenther and James Warren Falk

ABSTRACT: Circuitry is disclosed which uses a rotating magnetic disc file as an associative access memory. Each block of data stored on the file has associated with it a keyword, which keyword is used to access that particular block of data. The disc is partitioned into angular sectors and the blocks of data are stored in concentric, circular tracks as one block per sector per track, having their associated keywords recorded in radial tracks in the preceding sector. Data requests, including keyword information, are stored in a request hopper and are all simultaneously compared with each keyword as it is read from the disc. When a match occurs, the track defined by the matched keyword is read during the next sector in order to retrieve the requested block of data. Data requests may alternatively specify the track and sector address of a desired data block.

INVENTOR
D. VLACK
BY
R. C. Winter
ATTORNEY

ADVANCED KEYWORD ASSOCIATIVE ACCESS MEMORY SYSTEM

BACKGROUND OF THE INVENTION

This invention relates to information retrieval systems and, more particularly, to increasing the information retrieval rate in a bulk storage memory system.

In order to store large amounts of information efficiently and economically, several types of memory devices have been developed in recent years. Probably two of the most popular devices developed for this purpose are the magnetic drum and magnetic disc, sometimes referred to as sequential access memories. This type of memory stores information in the form of binary bits represented by the magnetization state of material coating the surface of a moving member. Heads are provided in close proximity to the moving surface to read or detect changes of magnetic flux as the surface passes by. The heads convert these changes of flux into electrical signals and also can be energized to write or change the state of the magnetic flux on the moving surface. The bits are stored on "-tracks" in the device, a track being defined as the area passing underneath a particular head during the rotation of the device. The reading operation does not destroy the magnetic state of the material passing under the heads, this state being changed only by a writing operation. Thus, in order to "erase" a track, a signal must be applied which will cause the head associated with that track to write and give the surface a predetermined magnetic state, usually one of uniform magnetization in a single direction. Large amounts of information can be stored on these devices, bit-packing densities on the order of 1,000 bits per linear inch quite commonly being attained.

Of course, the storage of large amounts of data is in itself useless unless the data can be retrieved from storage in an efficient manner. A popular technique for accessing information stored in large capacity memories is one in which the information to be retrieved is addressed by the information itself. The memory device, when this accessing technique is used, is sometimes referred to as an associative access file. The information stored on the file is in the form of words composed of binary bits. Some of the bits within a word contain address information for the word. When it is desired to retrieve a particular information word from the file, the address information of the word is provided to the information retrieval system. The tracks of the file are then searched until a word is encountered whose address information bits match the address information supplied. Therefore, a great amount of unproductive time is spent in searching. Priorly, one solution to reducing the time involved in searching was to arrange the information words on the file in a predetermined order corresponding to the address information of the words. When the information was of a continually changing character, this ordering created the additional problem of inserting data entries into their proper positions within the predetermined order. Furthermore, this approach negated the possibility of retrieving information by specifying an absolute address, i.e., a fixed position on the file, since the addresses of the ordered data entries are not fixed and may change when a new entry is inserted. The time involved in searching could also be advantageously reduced if simultaneous searching for more than one data entry is possible.

It is therefore an object of the present invention to provide an information retrieval system utilizing a sequential access memory.

It is a further object of this invention to provide apparatus adapted to achieve a high information retrieval rate from the memory.

It is another object of this invention to provide apparatus for retrieving information from the memory in either an associative or absolute addressing manner.

SUMMARY OF THE INVENTION

In accordance with this invention, apparatus is provided for retrieving information from a rotating single-head-per-track magnetic memory device. In the illustrative embodiment of this invention, the memory device used is a magnetic disc file unit.

The disc file unit is driven at a uniform speed of rotation so that the bit locations on the surface of the disc occur in a fixed time relationship. The disc is partitioned into equal angular sectors and the tracks of the disc are divided into two groups. Information is stored on a first group of concentric, circular tracks in the form of data blocks, with one data block being stored on each track in each sector. Each data block has associated with it a unique keyword, the keyword being used to identify and access the data block. The number of tracks in the second group is equal to the number of bits in each keyword, the keywords being stored on the second group of tracks parallel-by-bit and serial-by-word. For the sake of simplicity, these parallel keywords may be considered as being stored on "radial" tracks, there being as many radial tracks in each sector as there are circular tracks on the disc. Each keyword is stored in the sector immediately preceding the sector containing its associated data block. Within a sector, the radial track upon which is stored a particular keyword is determined by the circular track upon which contains its associated data block; i.e., the keyword on the *i*th radial track in a sector corresponds to the data block on the *i*th circular track in the next sector.

When data requests are provided to the system of the illustrative embodiment, these requests are all stored in a request hopper. Requests may either be associative or may specify an absolute address (circular track and sector) on the disc. A portion of each associative data request corresponds to one of the keywords. The keywords are read in sequence from the disc and as each keyword is read it is simultaneously compared with the above-mentioned portion of all the associative data requests stored in the hopper. A counter is provided to count the radial tracks within a sector as each keyword is read from the disc. When a match occurs between a keyword and an associative request, the count determined by the counter is stored and is subsequently used as the data track address in the next sector.

Apparatus is further provided to register the next sector from which data will be read. The sector portions of all absolute data requests are compared with the registered sector, within the same aforementioned request hopper. When a match of this type occurs, the specified track portion of the matched request is used as the data track address in the next sector and the desired data block is read from the disc.

Accordingly, it is a feature of the present invention that a magnetic record member is divided into sectors in which keywords and data blocks are stored, the keywords being stored in sectors preceding the sectors containing their associated data blocks.

It is another feature of the present invention that the magnetic record member is a disc comprising radial tracks for storing keywords and concentric circular tracks for storing data blocks.

It is a further feature of the present invention to enable simultaneously all radial track heads in a sector in order to determine which single circular track head to enable in the succeeding sector.

It is still another feature of the present invention to provide counting means for determining the position of a keyword within a sector, the particular count specifying the circular track containing the corresponding data block.

It is yet another feature of the present invention to compare simultaneously all data requests with information from a sector of the disc in order to determine the location in the succeeding sector from which information will be retrieved.

GENERAL DESCRIPTION

Figure 1:
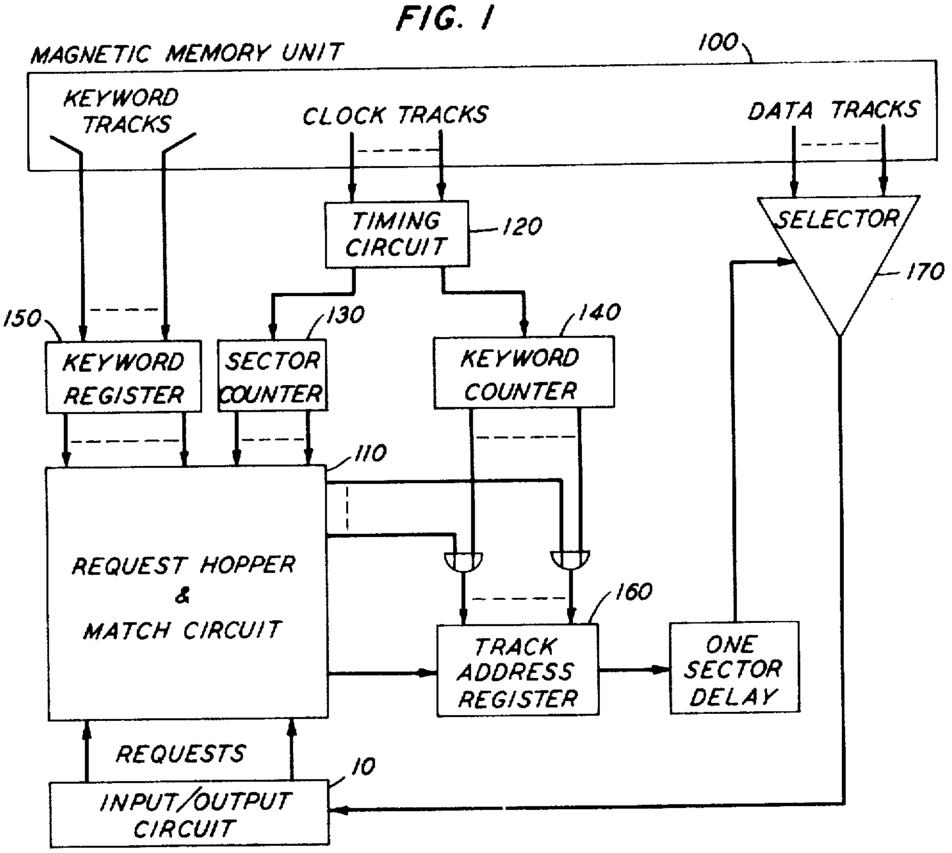
FIG. 1 shows a conceptual block diagram of an illustrative information retrieval system operating in accordance with the principles of the present invention.

FIG. 1 shows an information retrieval system adapted to receive information requests from input/output circuit 10, to search magnetic memory unit 100, and to transmit the data corresponding to the request to input/output circuit 10. Magnetic memory unit 100 is preferably a rotating magnetic memory device, such as a magnetic disc or drum, wherein the information is stored on tracks of the device.

Figure 2:
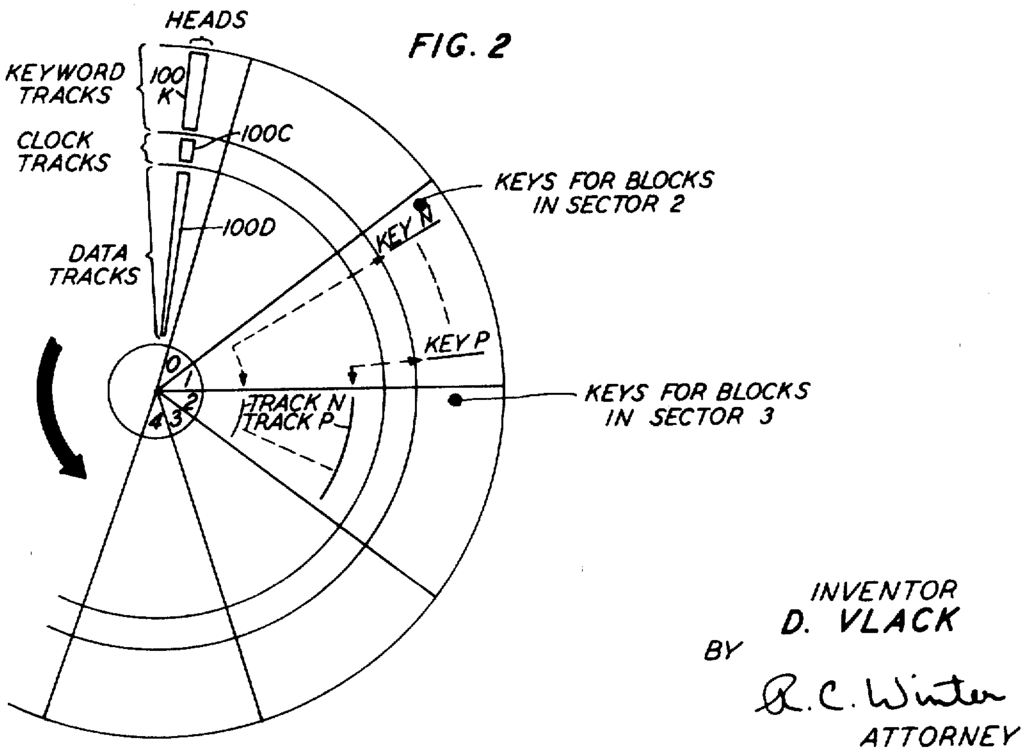
FIG. 2 represents the layout of a magnetic disc used in the illustrative information retrieval system.

Before proceeding further with a discussion of the system of FIG. 1, it would be advantageous to refer to the memory outlined in FIG. 2. This figure shows a simplified drawing of one surface of a magnetic disc which may preferrably be used as the bulk memory device 100 in the illustrative embodiment of the present invention. In order to simplify matters, the heads of the disc are pictured as being aligned along a radius of the disc. As is shown in FIG. 2, the surface of the disc is partitioned into a number of equal angular sectors and the tracks are divided into three groups, each group having a corresponding group of heads. The keyword tracks are accessed by heads 100K, the clock tracks by heads 100C, and the data tracks by heads 100D.

The clock tracks have the basic timing information for the system written thereon prior to the system's being put into operation. This information remains on these tracks at all times, being of a permanent read-only nature. There are four circular clock tracks, each of which contains a different form of timing information. The first of these tracks contains what will be referred to as the Track Index (TI), the second contains the Sector Bits (SB), the third contains the Serial Clock (SC), and the fourth contains the Parallel Clock (PC). The track containing the Track Index is uniformly magnetized in a single direction with the exception of a small portion which is magnetized in the opposite direction. The second clock track, SB, is also uniformly magnetized in a single direction except for small portions, one in each sector, which are magnetized in the opposite direction. The third and fourth clock tracks are magnetized in patterns of alternating magnetic polarities, each unit of each pattern being of the same length. These latter two tracks differ in that the unit lengths are different for each of the two tracks.

Information is stored on the circular data tracks in the form of data blocks, one block per sector per track. Associated with each data block is a unique keyword, this keyword being stored on a radial keyword track in the sector immediately preceding the sector in which is stored the associated data block. The particular radial tracks within a sector upon which are stored the keywords are determined by the respective circular tracks in the succeeding sector upon which are stored the corresponding data blocks.

Returning to FIG. 1, all requests for information come from input/output circuit 10 and are stored in request hopper and match circuit 110. These requests may be of two types; a request specifying the keyword of a desired data block, or a request specifying the sector and circular track in which a desired data block is stored. The first type of request is hereinafter referred to as an associative request and the second type of request as an absolute request.

The outputs from the clock tracks go to timing circuit 120 which generates all the timing signals for the system. Only two of these signals need be mentioned at this time. The first of these is the signal generated from the Sector Bits that enables sector counter 130 to determine and register which of the sectors will next pass underneath the heads of memory unit 100. The other signal is generated from the Parallel Clock and is used by keyword counter 140 to determine the radial track within the sector upon which is stored the keyword presently being read.

The keywords are read from memory unit 100 and are stored, one at a time, in keyword register 150. Request hopper and match circuit 110 receives the outputs of keyword register 150 and sector counter 130. These outputs are compared with the requests stored in circuit 110, the output of register 150 being compared with all associative requests and the output of counter 130 being compared with the sector portion of all absolute requests. When a match occurs, track address register 160 is notified of this condition and the type of request matched. Register 160 then accepts as its input either the output of keyword counter 140 or the track portion of an absolute data request, depending upon whether the matched request was associative or absolute, respectively. The contents of track address register 160 are then used during the next sector to control selector 170 so that the desired data block may be read from memory unit 100 and transmitted to input/output circuit 10.

DETAILED DESCRIPTION

Figures 3, 3B:
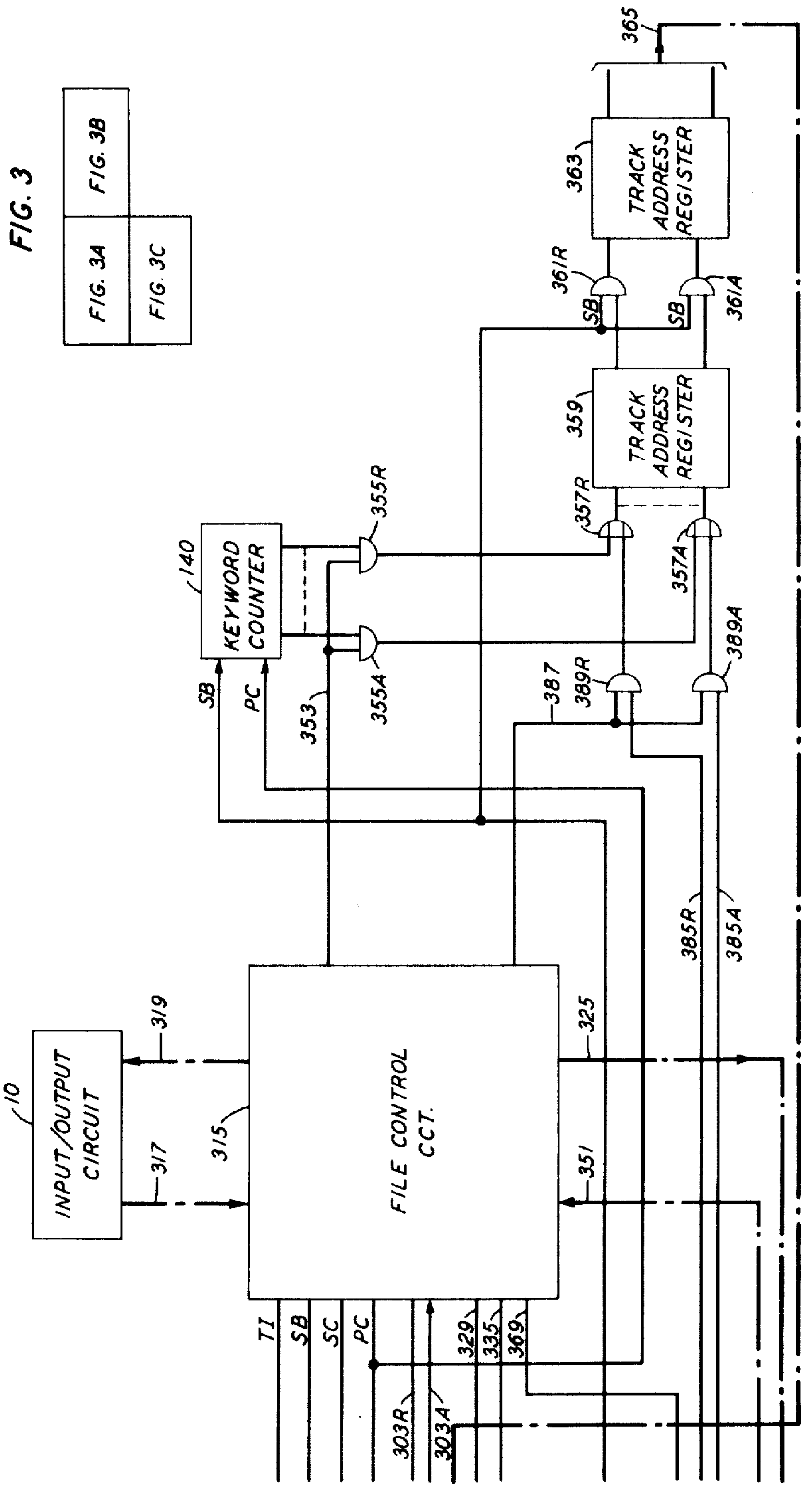
FIG. 3A through 3C, when arranged as shown in FIG. 3 provides a schematic representation in greater detail of the system depicted in FIG. 1.
Figure 3A:
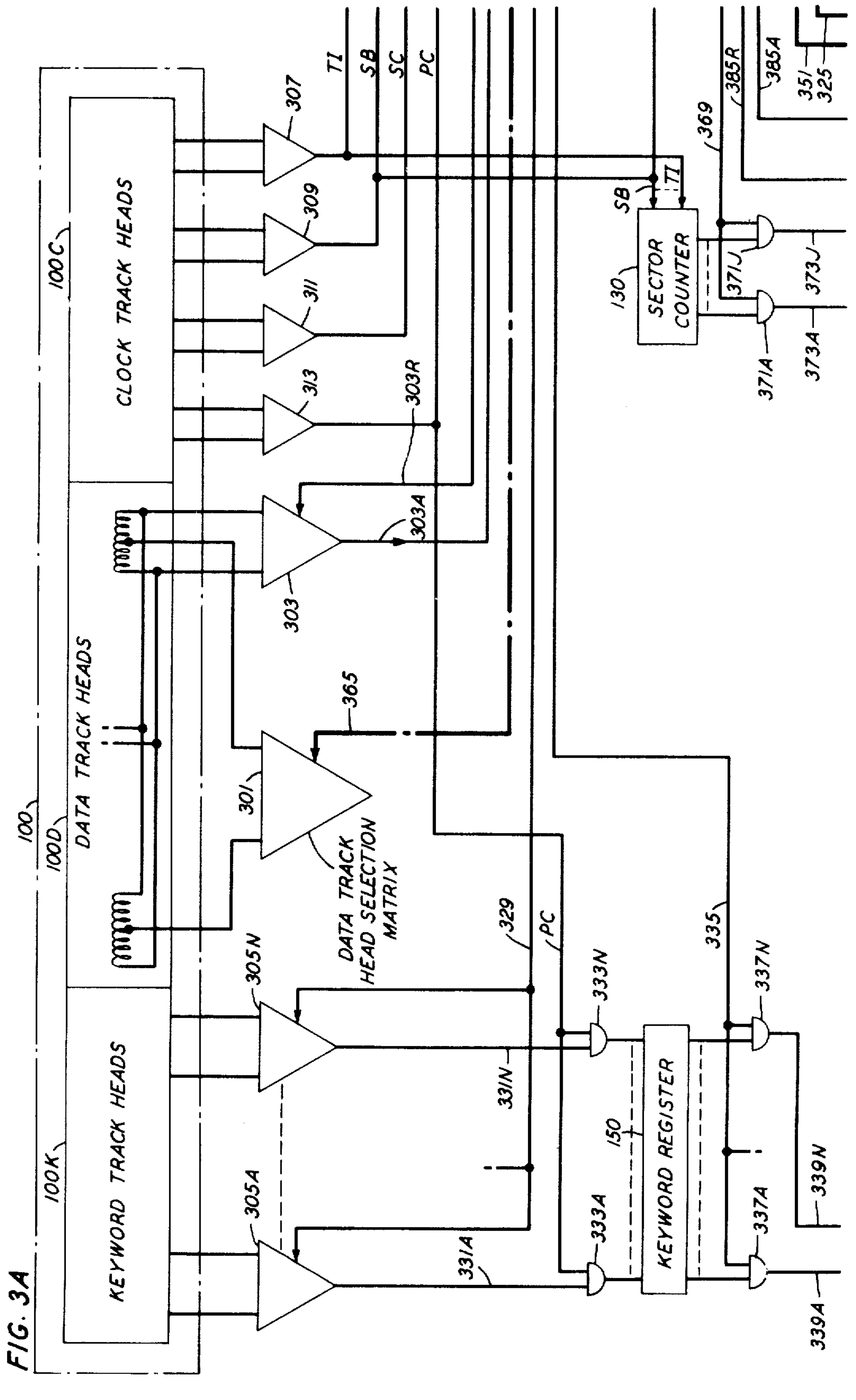
Figure 3C:
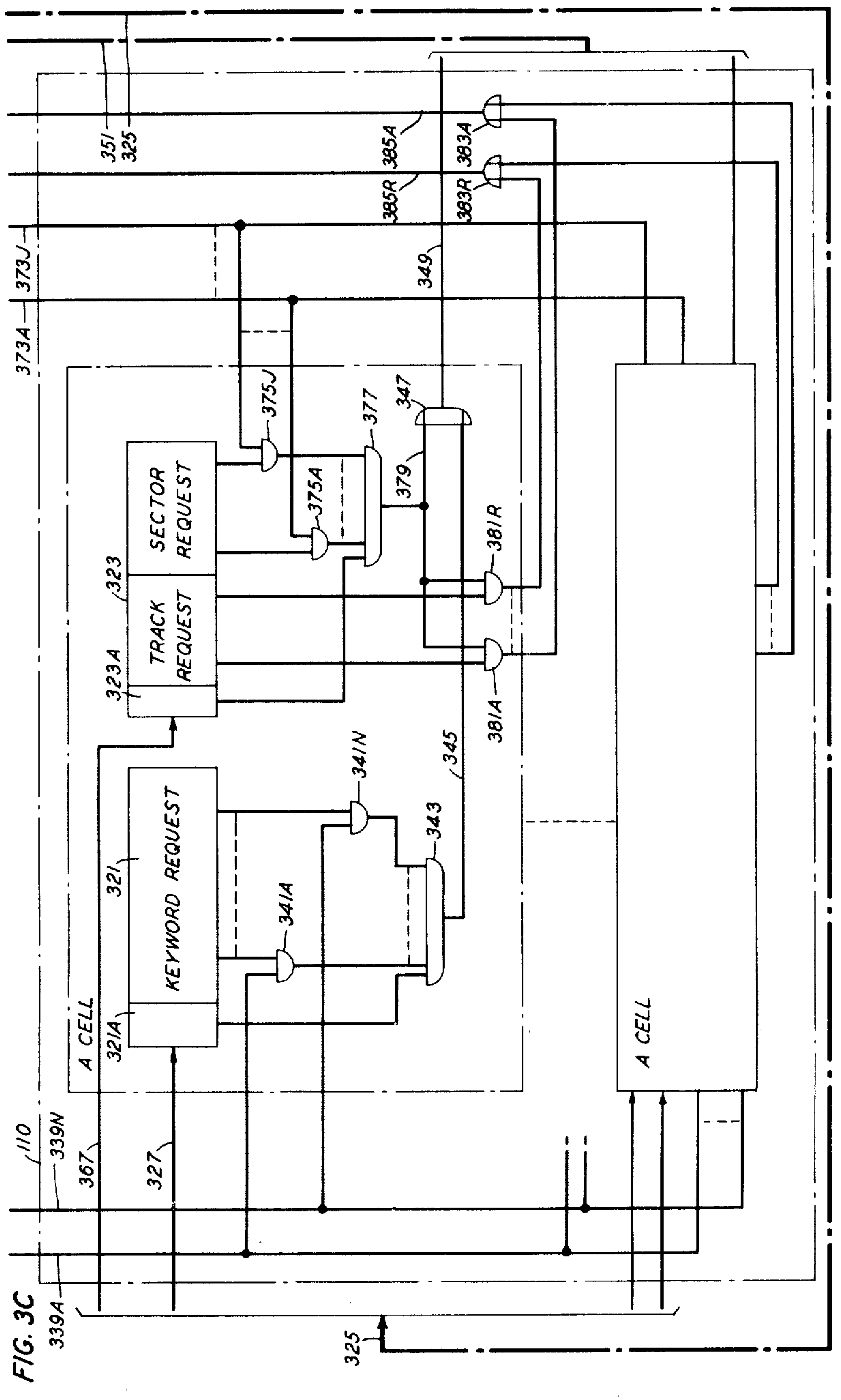

Turning now to the illustrative embodiment of this invention, depicted in FIGS. 3A through 3C, magnetic memory unit 100, FIG. 3A, is a magnetic disc file unit laid out as previously described and as shown in FIG. 2. This disc file unit includes a plurality of read/write heads 100C, 100D, 100K, each of which comprises a center-tapped winding. A particular one of the data track heads 100D is selected for reading or writing by data track head selection matrix 301 applying a reference potential to the center tap of that particular head. When a head is enabled for reading, each change of magnetic flux that passes under the head produces electrical pulses of opposite polarities at the two outer terminals of the head. The polarities are dependent upon the direction of the flux change. The pulses from the two ends of the enabled head are transmitted to the two inputs of difference amplifier 303. Amplifier 303 is arranged with two outputs, one for each direction of flux change. Thus, an alternating pattern of magnetic flux passing under an enabled head will result in a stream of pulses at each output of the corresponding amplifier, the pulses in one stream being intermediate in time between the pulses in the other stream. Information is written onto the disc in a non-return-to-zero manner with one direction of magnetization corresponding to a binary "1" and the other direction of magnetization corresponding to a binary "0." Therefore, a pulse will be produced at one of the two outputs of an amplifier only when adjacent bits have different binary values. To determine the value of a recorded bit, a flip-flop, not shown, is connected to the outputs of amplifier 303. This flip-flop stores the direction of the last change of magnetic flux passing under the enabled head. In order to write information onto the disc file unit, signals must be applied to either one side or the other of an enabled head, depending upon the binary value of the information to be written.

As was previously described, each keyword is written on a distinct radial track. Therefore, in order to read the keywords, all of the keyword track heads 100K must be enabled simultaneously. In the illustrative embodiment of the present invention, these keyword track heads 100K are all always enabled by a fixed reference potential being permanently applied to all of their center taps. Amplifiers 305A–305N are identical to amplifier 303 and each has a similar flip-flop connected to its outputs.

The flux changes of the Track Index track are sensed by amplifier 307. It will be recalled that the track Index track is uniformly magnetized in a single direction with the exception of a small portion which is magnetized in the opposite direction. Therefore, in one complete revolution of the disc, the head associated with the Track Index track will detect, and convert into electrical pulses, two changes of magnetic flux. Amplifier 307 is arranged to amplify and transmit only one of these two pulses. This pulse is designated Track Index (TI) and occurs once per revolution, being used merely to mark the "beginning" of all tracks. Amplifier 309 is also arranged to amplify and transmit only those pulses associated with one of the two directions of magnetic flux changes. This amplifier is connected to the outputs of the head associated with the track containing the Sector Bits. The pulses transmitted by amplifier 309 are designated SB. Only one of these pulses occurs per sector and is used to mark the beginning of that sector for all tracks. The magnetic flux changes detected by the head associated with the Serial Clock track are converted into two pulse streams at the outputs of amplifier 311, where they are OR-ed together to form a single stream of uniform polarity pulses designated as the Serial Clock (SC). Each pulse in the Serial Clock defines a time slot for a single bit of data on the data track. Amplifier 313 performs exactly the same function, and is identical to, amplifier 311 with regard to the Parallel Clock track. This Parallel Clock (PC) contains pulses which each define a time slot for a keyword received in parallel from the keyword tracks.

In the system of FIGS. 3A through 3C, file control circuit 315 transmits enabling and gating signals to the various other units of the system in order to control information retrieval from, and information insertion onto, disc file unit 100. Circuit 315 functions as the coordinator of the system's operations, and either a wired logic or stored program machine may be designed, according to any of a number of well-known techniques, to function in this capacity. Therefore, no detailed description will be given of this circuit. Input/output circuit 10 is representative of all the circuitry which communicates with the system of the illustrative embodiment. Circuit 10 may be any of the many types of communication circuitry known in the prior art and it is not necessary to describe it in any detail except to say that it transmits information requests and information changes to file control circuit 315 over cable 317 and receives in turn responses from file control circuit 315 over cable 319.

Request hopper and match circuit 110, FIG. 3C, contains a number of identical units, each designated as an A cell in the drawing. Each A cell contains a register 321 for storing an associative request and a register 323 for storing an absolute request, as well as logic gates which are used to compare the requests with information from disc file unit 100. The number of A cells within request hopper and match circuit 110 is dependent upon how many requests it is desired simultaneously to handle but this number is not important to an understanding of the present invention. In general, both types of requests, associative and absolute, are handled simultaneously. However, for reasons of clarity, separate discussions will be given for the two types.

File control circuit 315 is equipped with a scratch pad memory which stores the status, i.e., busy or idle, of each A cell in request hopper and match circuit 110 as well as the request which is stored in each A cell. When file control circuit 315 receives an associative request from input/output circuit 10 over cable 317, this request contains the bits of a keyword plus certain bits which indicate that the request is an associative request. File control circuit 315 then searches its memory to find an idle A cell in request hopper and match circuit 110. The received keyword is then transmitted by circuit 315 over the input lead in cable 325 which corresponds to the associative request register in the idle A cell. This input lead may be for example, lead 327. The received keyword is entered into register 321 and an activity bit, which signifies a busy A cell, is entered into cell 321A of register 321. Circuit 315 then updates its memory to indicate that the particular A cell into which the request has been entered is now busy.

Lead 329 is used by circuit 315 to enable amplifiers 305A–305N to transmit the keywords read from the keyword tracks over leads 331A–331N to gates 333A–333N. Lead PC transmits thereon pulses corresponding to the Parallel Clock. Each of these pulses defines a time slot for a keyword, and these pulses are used to gate the signals on leads 331A–331N through gates 333A–333N keyboard register 150. An enabling voltage is applied to lead 335 by circuit 315 to indicate that an associative search is required. This enables gates 337A–337N, and the contents of keyword register 150 is therefore transmitted to request hopper and match circuit 110 over leads 339A–339N.

Leads 339A through 339N are connected to every A cell in request hopper and match circuit 110. This allows each keyword to be compared with every associative request which is being handled by the system. Gates 341A–341N are used to compare the bits of the keyword stored in register 321 with the bits of the keyword read from disc file unit 100 and transmitted over leads 339A–339N. The outputs of gates 341A–341N are transmitted to gate 343 as is the activity bit stored in cell 321A. When the keyword stored in register 321 matches a keyword read from disc file unit 100 and the activity bit in cell 321A indicates that the particular A cell is primed to match associative associative request, an indication of such a condition is transmitted through gate 343 onto lead 345, through OR gate 347, onto lead 349, and to file control circuit 315 over cable 351. Each lead in cable 351 corresponds to a unique A cell in request hopper and match circuit 110, so that file control circuit 315 is made aware of which request being handled by the system has been matched.

When circuit 315 is notified of an associative request match, an enabling pulse is placed upon lead 353 to one of the two inputs of each of gates 355A–355R. The other input of each of these gates is an output of keyword counter 140 which uses the Parallel Clock and the Sector Bits to count the number of keywords which have been read up to a particular time from disc file unit 100 within a sector. The pulse on lead 353 allows this count to be transmitted through gates 355A–355R and then through gates 357A–357R into track address register 359. When file control circuit 315 receives a match indication on cable 351, it removes the enabling signal from lead 335 so that no more requests are matched in this sector, and it also updates its memory and the activity bit in the A cell which signalled the match to indicate that the A cell is again idle and ready to accept a new request. The enabling signal is placed back upon lead 335 during observation of the next sector, as determined by circuit 315 receiving a pulse on lead SB. This pulse on lead SB also gates the contents of register 359 through gates 361A–361R into track address register 363. The contents of track address register 363 is transmitted over cable 365 to data track head selection matrix 301, where matrix 301 decodes the track address bits and places an enabling reference potential upon the center tap of the data track head corresponding to the track associated with the matched keyword. An enabling signal is also placed upon lead 303R to enable amplifier 303 to transmit the data block recorded on disc file unit 100 in the sector following the sector of the matched keyword and upon the track defined by the position of the keyword. This data block is transmitted to file control circuit 315 over lead 303A, and is then transmitted to input/output circuit 10 over cable 319.

When file control circuit 315 receives an absolute request from input/output circuit 10 over cable 317, this request contains bits designating the sector and track containing a desired data block, plus certain bits recognizable by file control circuit 315 as indicating that the request is an absolute request. Circuit 315 then searches its memory to find an idle A cell in request hopper and match circuit 110 and transmits the received absolute address over the input lead in cable 325 which corresponds to the absolute request register within the idle A cell. This input lead may be, for example, lead 367. The received absolute address is entered into register 323 and an activity bit is entered into cell 323A. Circuit 315 then updates its memory to indicate that the A cell into which the request has been entered is now busy.

An enabling voltage is then placed upon lead 369 by circuit 315 to enable gates 371A–371J. These gates are also connected to the outputs of sector counter 130 which uses the Track Index and the Sector Bits to determine the sector which will next be underneath the heads. With an enabling voltage on lead 369, the sector count is transmitted through gates 371A–371J onto lead 373A–373J into request hopper and match circuit 110 where these leads are connected to every A cell. Gates 375A–375J are used to compare the bits of the sector request with the bits of the sector which will next pass under the heads, as determined by sector counter 130 and transmitted over leads 373A–373J. The outputs of gates 375A–375J are transmitted to gate 377, as is the activity bit stored in cell 323A. When the next sector matches the sector request and the activity bit in cell 323A indicates that the particular A cell is primed to match an absolute request, an indication of such a condition is transmitted through gate 377 onto lead 379, through OR gate 347 onto lead 349 and to file control circuit 315 over cable 351. At the same time, the signal on lead 379 is used to transmit the track request stored in register 323 through gates 381A–381R, through gates 383A–383R, and onto leads 385A–385R.

When circuit 315 is notified of an absolute request match by a signal on one of the leads in cable 351, an enabling pulse is placed upon lead 387 to one of the two inputs of gates 389A–389R. The other inputs of these gates are the track request bits which are on leads 385A–385R. The pulse on lead 387 allows the track request to be transmitted through gates 389A–389R and then through gates 357A–357R into track address register 359. The match indication on cable 351 causes circuit 315 to remove the enabling signals from leads 335 and 369 so that no more requests are matched in this sector. The condition of the system is now the same as was previously described when an associative request was matched. The desired data block is transmitted in the manner previously described to input/output circuit 10 over cable 319, and file control circuit 315 updates its memory and the activity bits in the A cell which previously indicated a match to indicate that this A cell is now idle.

Input/output circuit 10 can also transmit to file control circuit 315 disc file information change orders. These orders, like the requests, can be of two types. The first type specifies an absolute address on the disc into which information is to be inserted or from which information is to be deleted. The second type specifies information which may be inserted anywhere on the disc. Techniques for inserting information onto, and deleting information from, a magnetic disc file are known in the art. Knowledge of the circuitry required to perform these functions in order to conform with the requirements of my invention is not necessary for an understanding of my invention, and so no discussion of this circuitry will be given herein. It would be apparent to one skilled in the art how to design such circuitry.

Accordingly, I have shown an arrangement for enhancing the information retrieval rate from sequential access memory wherein associative and/or absolute addressing may be employed. This is achieved in part by partitioning the memory into equal angular sectors and dividing the tracks into two groups. Absolute addressing is accomplished by specifying the track and sector in which is stored a desired block of data. Associative accessing is accomplished by storing keywords, which are part of the associative requests and uniquely correspond to the data blocks, on one of the track groups in the sectors immediately preceding the sectors of their corresponding data blocks. The positions of the keywords within their sectors are determined by the tracks upon which are stored the corresponding data blocks, so that a count of the keywords is sufficient to define the track of a desired data block. I provide circuitry to store several data requests of both types and simultaneously attempt to retrieve all the stored requests, thereby achieving a high information retrieved rate.

It is understood that the above-described arrangement is merely illustrative of the application of the principles of this invention. Numerous other arrangements may be devised by those skilled in the art without departing from the spirit and scope of my invention.

What is claimed is:

1. A memory system comprising
- a rotating memory partitioned into a plurality of sectors and including a plurality of tracks storing blocks of data in each of said sectors;
- means for accessing said sectors in sequence;
- means for simultaneously examining a plurality of data requests, each of said requests specifying the track and sector addresses of storage of corresponding ones of said data blocks, said examining means including means counting said sectors and means operative while one sector is being accessed for comparing sector addresses specifies by said requests with a count specified by said counting means, said comparing means including means for producing an examining means output in response to a match of one of said specified sector addresses with a count of the next sector to be accessed;
- means responsive to said examining means output for registering the track address specified by the data request which specified the matching sector address; and
- means responsive to said examining means output for retrieving a data block stored at the matching sector address and the registered track address.

2. A memory system comprising
- a rotating memory partitioned into an ordered plurality of sectors and including a plurality of tracks, certain of said tracks storing blocks of data in each of said sectors and certain others of said tracks storing keywords in each of said sectors, each of said keywords being associated with a respective one of said data blocks and stored on one of said certain other tracks within the sector immediately preceding the sector containing said respective data block, the relative position of each keyboard on said certain other tracks being determined by the relative position of said respective data block on said certain tracks;
- means for simultaneously examining a plurality of data requests, said requests specifying keywords of corresponding ones of said data blocks, said examining means including means for retrieving one of said keywords from said memory and further including means for comparing said retrieved keyword with said requests, said comparing means including means producing an examining means output when said retrieved keyword matches one of said requests;
- counting means providing a count indicating which of said certain other tracks contains said retrieved keyword; and
- means responsive to said examining means output and said count for retrieving from said certain tracks the data block associated with the matched retrieved keyword.

3. An associative access memory system comprising a disc containing concentric circular tracks for storing distinct blocks of data in successive track segments defining angular sectors and radial tracks containing keywords for determining the location of said stored data blocks, each of said radial tracks uniquely corresponding to a one of said track segments of said circular tracks, means for storing requests for retrieval of predetermined ones of said stored data blocks from said disc, means for comparing said keywords with said requests including means producing an output when one of said keywords matches one of said requests, means identifying said radial tracks, and means responsive to said output and an identification of the radial track containing said one keyword for retrieving from said disc the data block corresponding to said one request.

4. An associative access disc memory comprising concentric circular tracks segmented in angular sectors, each of said sectors comprising radial tracks containing keywords of data blocks stored in circular track segments of uniquely corresponding sectors, means for comparing keywords from said memory with requests for readout of data blocks and means responsive to a match in said comparing means and an identification of the radial track containing the keyword producing the match for retrieving the data block corresponding to the keyword producing the match.

5. A disc memory in accordance with claim 4 and further comprising a plurality of magnetic heads and wherein said comparing means comprises means for enabling a plurality of said heads simultaneously for the parallel reading of one of said radial tracks and said retrieving means comprises means for enabling one of said heads for the sequential reading of one of said circular track segments.

6. A disc memory in accordance with claim 5 further comprising means for enabling simultaneously said heads of said radial tracks with said one of said heads of said circular track segments and memory means for storing said keywords read from said radial tracks.

7. An associative access data storage and retrieval system comprising a memory device containing means for storing distinct data blocks and corresponding keywords, means for comparing said stored keywords with data block requests, said comparing means including means producing an output when one of said keywords matches one of said requests, and means responsive to said output for retrieving the data block corresponding to said one of said keywords from said memory device, characterized in that said storing means comprises concentric circular tracks for storing said data blocks in successive angular sectors and said sectors include radial tracks for storing keywords each identifying a data block stored in an adjacent angular sector, the number of said radial tracks in each of said angular sectors corresponding to the number of said circular tracks.

8. A data storage and retrieval system comprising a rotating memory partitioned into a plurality of sequentially accessed angular sectors and including a first plurality of tracks arranged to store a plurality of data blocks in each of said sectors and a second plurality of tracks arranged to store a plurality of keywords in each of said sectors, each of said keywords corresponding to a respective one of said data blocks and stored in the sector immediately preceding the sector containing said respective data block, the relative position of said each keyword on said second plurality of tracks being determined by the relative position of said respective data block on said first plurality of tracks;

means storing a plurality of data requests, said requests being of a first type and a second type, said first type of data request specifying an absolute sector and track address of a data block and said second type of request specifying a keyword of a data block;

first counting means providing a first count indicating which of said sectors is the next to be accessed;

first comparing means comparing said first count with sector addresses specified by said requests of said first type including means producing a first output when said first count matches one of said specified sector addresses;

means retrieving said keywords in sequence from said rotating memory;

second counting means providing a second count indicating the position of a retrieved keyword within a sector;

second comparing means comparing said retrieved keyword with keywords specified by said second type of request including means producing a second output when said retrieved keyword matches one of said specified keywords;

means for registering the address of one of said first plurality of tracks;

means responsive to said first output for storing in said registering means the track address specified by the one of said first type of requests which caused said first output and responsive to said second output for storing in said registering means said second count; and means responsive to either of said outputs for retrieving from said rotating memory in the next sector to be accessed the data block stored on the track specified by the contents of said registering means.

9. A data storage and retrieval system in accordance with claim 8 wherein said second plurality of tracks comprises radial tracks, there being as many radial tracks in each of said angular sectors as there are said first plurality of tracks, and said second counting means includes means counting said radial tracks within each of said sectors.